United States Patent [19]

Stookey

[11] Patent Number: 5,618,518
[45] Date of Patent: Apr. 8, 1997

[54] METHODS AND COMPOSITIONS FOR USE AGAINST DENTAL CALCULUS IN DOMESTIC ANIMALS

[75] Inventor: George K. Stookey, Noblesville, Ind.

[73] Assignee: Indiana University Foundation, Bloomington, Ind.

[21] Appl. No.: 470,628

[22] Filed: Jun. 6, 1995

[51] Int. Cl.$^6$ .............................. A61K 7/16; A23L 1/304
[52] U.S. Cl. ................. 424/57; 424/49; 426/805
[58] Field of Search ................ 424/49–58; 426/805

[56] References Cited

U.S. PATENT DOCUMENTS

| | | | |
|---|---|---|---|
| 4,011,346 | 3/1977 | Ernst | 426/104 |
| 4,913,895 | 4/1990 | Miyake et al. | 424/57 |
| 5,047,231 | 9/1991 | Spanier et al. | 424/57 |
| 5,114,704 | 5/1992 | Spanier et al. | 424/57 |
| 5,296,217 | 3/1994 | Stookey | 424/57 |
| 5,460,802 | 10/1995 | Asami et al. | 424/49 |
| 5,500,020 | 3/1996 | Bandino | 8/94.22 |

Primary Examiner—Shep K. Rose
Attorney, Agent, or Firm—Woodard, Emhardt, Naughton, Moriarty & McNett

[57] ABSTRACT

A chew product useful against the build-up of dental calculus on the teeth of animals contains an amount of sodium hexametaphosphate effective to reduce the development of dental calculus. The chew product in one embodiment is prepared by soaking the product in an aqueous solution containing from about 0.5% to about 3.0% by weight sodium hexametaphosphate. Also disclosed are methods for preparing the novel chew product and for using the chew product containing sodium hexametaphosphate to reduce and/or prevent the build-up of dental calculus on the teeth of animals.

17 Claims, No Drawings

METHODS AND COMPOSITIONS FOR USE AGAINST DENTAL CALCULUS IN DOMESTIC ANIMALS

BACKGROUND OF THE INVENTION

1. Field of the Invention

The present invention relates generally to agents for reducing or preventing the build-up of dental calculus, commonly called tartar, in domestic animals. More particularly, the invention relates to methods and compositions relating to rawhide and other products chewed by animals and coated with a calculus-preventing agent.

2. Description of the Prior Art

Dental calculus, or tartar, is recognized as a recurring calcified deposit on the surfaces of the teeth of domestic animals, including dogs and cats, as well as humans. It is generally recognized that dental calculus develops in a sequential process that involves the accumulation of dental plaque and the subsequent calcification of the plaque by saliva, which has very high concentrations of calcium and phosphate. Although calculus, per se, is not directly responsible for the development of oral diseases, it is recognized as a secondary, or contributing, factor in the development of periodontal disease because: (1) its presence on the teeth serves as a local irritant to the adjacent soft tissues, eliciting an inflammatory response (and soft tissue inflammation is the initial phase of periodontal disease); (2) it interferes with the normal cleansing of the tooth surfaces, which occurs during the mastication of food or through the performance of conventional oral hygiene procedures, such as toothbrushing and flossing; and (3) it harbors bacterial toxins, which exacerbate periodontal disease formation, by virtue of its porosity. Once formed, calculus deposits can only be removed through concerted mechanical procedures, i.e., a dental prophylaxis. Thus, the prevention of dental calculus is of importance not only for cosmetic reasons, but also because of dental calculus' secondary role in the development of periodontal disease, and the resultant systemic infections, alveolar bone recession, tooth loss and adverse mouth/breath odors.

At present, the recognized approaches for the prevention of dental calculus formation are: (1) the meticulous, daily removal of dental plaque prior to its calcification; and (2) the daily application of crystal growth inhibitors that interfere with the calcification of dental plaque by saliva. Known crystal growth inhibitors include various soluble pyrophosphates, sodium tripolyphosphate, soluble diphosphonates, and certain soluble zinc compounds, such as zinc chloride. These crystal growth inhibitors are currently being used in dentifrices and mouthwashes for preventing dental calculus formation in humans. Soluble pyrophosphates are also currently being cooked or baked in the dough of commercially-prepared diets for dogs and cats for the stated purpose of preventing dental calculus formation in these domestic animals.

It has also been reported that sodium hexametaphosphate has been found to be useful in preventing the build up of dental calculus. In U.S. Pat. No. 5,296,217, issued on Mar. 22, 1994, it is disclosed that sodium hexametaphosphate is successful in preventing or reducing calculus build-up when applied as a coating to pet foods.

SUMMARY OF THE INVENTION

Briefly describing one aspect of the present invention, there is provided a calculus preventing product comprising a chew product including sodium hexametaphosphate (HMP). In another aspect, there is provided a method for the reduction or prevention of the formation of dental calculus in domestic animals which includes contacting teeth with a chew product including sodium hexametaphosphate.

It is an object of the present invention to provide calculus-preventing products, namely chew products including sodium hexametaphosphate.

A further object of the present invention is to provide methods for reducing and/or preventing the build-up on teeth of dental calculus by providing for the contacting of the teeth with chew products including sodium hexametaphosphate.

Further objects and advantages of the present invention will be apparent from the description of the preferred embodiments which follows.

DESCRIPTION OF THE PREFERRED EMBODIMENTS

For the purposes of promoting an understanding of the principles of the invention, reference will now be made to the preferred embodiments illustrated in the following description and examples, and specific language will be used to describe the same. It will nevertheless be understood that no limitation of the scope of the invention is thereby intended, such alterations and further modifications in the preferred embodiments of the invention, and such further applications of the principles of the invention as described therein being contemplated as would normally occur to one skilled in the art to which the invention relates.

The present invention utilizes any of a variety of chew products which are provided with sodium hexametaphosphate (HMP). The sodium hexametaphosphate has been found to provide superior effect in reducing and/or preventing the build-up of dental calculus on the teeth of animals.

As used herein, the term chew products is used to refer to items which are intended for chewing by an animal for an extended period of time and have as one of their primary functions the removal of dental plaque through the normal mastication process. Such chew products typically have a useful life of several minutes to several hours, and thus the chew product and related method as contemplated herein provides for contact of the HMP-containing product with the teeth of an animal to be treated for an extended period of time, e.g., at least about 10 minutes, and preferably at least about 1 hour. The term chew products does not include products having the primary purpose of serving as food, such as dry dog food or dog biscuits. Thus, the chew products include, for example, raw hide materials as well as other materials known in the art to be suitable and intended for chewing by a domestic animal. By way of specific example, the chew products preferably include such items as nylon "bones" or rawhide strips.

A preferred chew product for use with the present invention is a rawhide product. Such products are well known in the art, and the exact composition or preparation of the rawhide is not critical to the invention. Therefore, detailed procedures for the preparation of such conventional rawhide materials is not provided herein. Exemplary procedures for the preparation of rawhide materials are disclosed in U.S. Pat. No. 5,047,231, issued to Spanier et al. on Sep. 10, 1991, and the pertinent portions thereof are hereby incorporated by reference. The rawhide material may be in any shape which can be chewed. Examples of such rawhide shapes are strips, balls made up of pieces or strips, knotted strips, bones made up of pieces or strips, curled pieces, etc. The rawhide also can be that which has been molded (e.g., compressed, extruded, stamped, tabletted, etc.) and formed.

The chew products are provided with an effective amount of sodium hexametaphosphate for delivery to the teeth of the animal upon chewing the product. HMP is preferably coated on the chew product. Typically, the chew product is soaked in an aqueous solution of HMP and the HMP is allowed to penetrate the entire chew product or at least the surface region of the product. Alternatively, the solution can be applied to the chew product by any other suitable means, such as spraying. The temperature at which application is made is not critical, and the HMP solution can be conveniently applied at room temperature. The treated chew product is thereafter dried. The conditions of drying are again not critical, and the products are therefore preferably air dried at moderate temperatures. It is also contemplated that the HMP may otherwise be provided with the chew product in a manner which will result in the delivery of the HMP from the product to the teeth during chewing. For example, the HMP could alternatively be absorbed throughout a relatively porous chew product.

The amount of HMP provided in the chew product is not critical, it having been determined that even very low amounts of HMP will have efficacy. The present invention therefore contemplates simply that an amount of HMP is provided in the chew product sufficient to be effective in the reduction and/or prevention of the formation of dental calculus on the teeth of an animal chewing the product. Naturally, the amount desired will vary with the effect being sought. Also, the amount which will be found effective will vary with the nature of the chew product and the amount of HMP provided in the product. Thus, a chew product which will have a prolonged period of use by the animal will be effective with lower amounts of HMP. Conversely, it may be desirable to use higher concentrations of HMP with chew products having a relatively shorter period of useful life. By way of example, it has been found useful to treat the chew product with a solution containing at least about 0.5% HMP based on the weight of the solution, and preferably from about 0.5% to about 3.0% HMP based on the weight of the solution. As the examples demonstrate hereafter, similar results are achieved with chew products treated with solutions containing 0.6% and 1.8% HMP.

Sodium hexametaphosphate is desirable in terms of its efficacy in the prevention of dental calculus, and in certain other respects. For example, HMP has been recognized for its biological/toxicological/pharmacological safety for ingestion by animals, as evidenced by its acceptance as GRAS by the U.S. Food and Drug Administration. Also, HMP is easy to apply as a coating to chew products without appreciably altering the organoleptic and palatability characteristics of the products.

HMP has also been recognized as being efficacious for calculus prevention when utilized at relatively low concentrations and is markedly superior for calculus prevention as compared to the most commonly-used crystal growth inhibitor of the prior art, i.e., soluble pyrophosphate. By comparison, prior art compositions have focused on crystal growth inhibitors such as the soluble pyrophosphates. HMP provides superior anticalculus efficacy, apparently operating as a sequestering agent forming soluble calcium complexes with the calcium in saliva and dental plaque fluids, thereby preventing the usual calcification of dental plaque on the surfaces of the teeth. The preferred sequestrant in accordance with the present invention is sodium hexametaphosphate, and other sequestering agents include hydroxycarboxylic acids including citric acid, fumaric acid, glutaric acid, acetic acid, oxalic acid, and the like, and their alkali salts, such as sodium citrate, potassium citrate, etc., as well as their aminopolycarboxylic acid derivatives, for example, ethylenediaminetetraacetic acid.

Further understanding of the present invention is provided in the following examples, which are intended to demonstrate the use and efficacy of the inventive methods and products, and are not to be considered as restrictive in nature.

GENERAL PROTOCOL

The subsequently described experimental studies designed to evaluate measures and agents for the prevention of dental calculus formation utilized a colony of 26 beagle dogs with a number of similar procedures. The animals were continuously housed in stainless steel cages or runs in an AAALAC-accredited facility in the Indiana University School of Dentistry. To establish the normal rate of calculus formation for each animal, they were administered a thorough dental prophylaxis (cleaning) to remove all existing calculus and other exogenous deposits (plaque, pellicle, debris) from all their teeth. The dogs were then provided with 250 g of a conventional Ralston Purina Company dry Dog Chow® brand diet, which is a nutritionally balanced dog ration. This feeding was provided once daily throughout a 28-day test period.

At the conclusion of the test period the animals were anesthetized and buccal (cheek) surfaces of their posterior teeth were clinically examined for the presence of calculus using a grading system similar to the Volpe-Manhold index used in human clinical trials of anticalculus agents. For this examination, each tooth surface was assigned a numerical score of 0 to 4 based on the amount of tooth surface covered with calculus as follows: 0=none; 1=less than 10% coverage; 2=10 to 33% coverage; 3=between 33 and 66% coverage; and, 4=greater than 66% coverage. These individual tooth surface scores were then summated and divided by the number of tooth surfaces graded to obtain a mean tooth surface score for each animal.

The calculus scores obtained during the baseline/pre-test period were considered to reflect the normal rate of calculus formation for each animal and were used to stratify the animals into groups for all subsequent tests. For example, for a planned 4-group test, the individual animal scores were ranked from the highest to lowest, stratified into blocks of 4 (i.e., the 4 highest scores comprised the first block, the next 4 highest scores comprised the second block, etc), and then randomly assigned within blocks to each of the 4 groups (so-called randomized block procedure). Thus, each group was comprised of randomly-selected representative animals from each block. In some instances, depending upon the number of groups, a middle block was incomplete due to the number of animals available in the colony.

In all experimental studies, the clinical examinations were performed without knowledge of treatment groups by an examiner not otherwise involved in group assignment or daily feeding regimens. Further, the sequence of examinations was randomized to minimize systematic bias due to examiner fatigue, etc.

For each experiment, the dogs were given a thorough dental prophylaxis immediately prior to initiation of the study. The animals were divided into the desired number of groups using the previously-described randomized block assignment procedure. The designated feeding regimens were provided beginning with the evening feeding following the prophylaxis, for 4 consecutive weeks. Food consumption was monitored for each animal at each feeding to assure that experimental differences were not confounded by differences in food consumption. The animals were then anesthetized and examined for dental calculus formation as previously described. The data were subsequently analyzed using conventional biostatistical procedures, which routinely involved an analysis of variance (ANOVA) with the Newman-Keuls test procedure used to identify statistically significant (p is less than 0.05) intergroup differences. Between experiments the animals were maintained on a conventional Ralston Purina Company dry Dog Chow® brand dog food regimen for a one-week (minimum) "washout" period to eliminate any possible carryover effects from the previous test.

EXAMPLE 1

An initial pilot study was performed to explore the concept of adding HMP as a coating to rawhide. Experimental rawhide strips were coated with solutions containing either 0.6% or 1.8% HMP. The dogs were provided a single meal of dry dog chow (Purina) each morning followed by a single piece of rawhide 5 hours later. The results observed in these dogs in each group which had at least 50% usage of their assigned rawhide strips were as follows:

| Regimen | No. Dogs | Calculus Score* | Percent Reduction | Significant Difference** |
|---|---|---|---|---|
| None (Control) | 7 | 2.40 ± 0.66 | — | — |
| Chew-eez ($P_2O_7$-Coated)*** | 3 | 1.69 ± 0.07 | 29.6 | No |
| 0.6% HMP-Coated Rawhide | 5 | 1.31 ± 0.33 | 45.4 | Yes |
| 1.8% HMP-Coated Rawhide | 4 | 1.17 ± 0.30 | 51.3 | Yes |

*Mean ± standard error of the mean
**Significantly different from control regimen
***Commercially-available rawhide product These pilot data confirmed the potential efficacy of HMP-coated rawhide and suggested little difference in efficacy between the use of 0.6% and 1.8% HMP in the coating solution. They also suggested that an HMP-coated product would be at least as effective as a commercially-available rawhide product coated with soluble pyrophosphate (Chew-eez).

EXAMPLE 2

Experimental rawhide was prepared by soaking dry rawhide strips in an aqueous solution of 0.6% sodium hexametaphosphate (HMP) and subsequently drying the strips. In this manner the resultant strips were coated with approximately 0.6% HMP.

The efficacy of the HMP-coated rawhide for calculus prevention was determined using a colony of 26 beagle dogs. The dogs were given a thorough dental prophylaxis to remove all existing dental plaque and calculus immediately prior to initiating each test period. They were then stratified into 3 comparable groups of 8 or 9 dogs according to their previously-determined rate of calculus formation. The individually-housed dogs were provided a single meal of 250 g of dry dog food (Purina Dog Chow®) each morning with fresh tap water available ad libitum. Five hours later the dogs in two groups were provided a single rawhide strip (about 2"×6") either with or without the HMP coating; the third group received no rawhide strips. This daily regimen was maintained for 4 weeks, at which time the dogs were anesthetized and examined for clinical calculus formation as described previously. The foregoing procedures were then repeated twice with the rotation of treatment regimens so that all animals could be evaluated when exposed to each of the 3 experimental regimens. As usual, measures were implemented to assure that the clinical examiner was not aware of the group or treatment assignments and thereby avoid any systematic bias.

Since several of the dogs in the foregoing study did not consume at least 50% of the rawhide strips (coated or non-coated) on a daily basis, these dogs were eliminated from all experimental groups. The results observed with the "regular rawhide chewers" are presented in the following table.

| Regimen | No. Dogs | Calculus Score* | Percent Reduction | Significant Difference** |
|---|---|---|---|---|
| None (Control) | 12 | 1.59 ± 0.19 | — | — |
| Non-Coated Rawhide | 12 | 1.16 ± 0.20 | 27.0 | No |
| HMP-Coated Rawhide | 12 | 0.93 ± 0.20 | 41.5 | Yes |

-continued

| Regimen | No. Dogs | Calculus Score* | Percent Reduction | Significant Difference** |
|---|---|---|---|---|

*Mean ± standard error of the mean
**Significantly different from the control (no treatment) regimen Again, the provision of non-coated rawhide strips numerically reduced calculus formation by 27.0% but this reduction was not statistically different from the no-treatment control regimen. (This difference approached significance, i.e., 0.10 <P>0.05, and probably would be statistically significant using a larger number of dogs.) On the other hand, provision of the HMP-coated rawhide strips resulted in a statistically significant reduction in calculus formation of 41.5% when compared to the control regimen.

EXAMPLE 3

An additional study was conducted to evaluate a modified HMP-coating procedure (i.e., prolonged soaking time); however, the results did not alter the conclusions observed in the previously-described study. In this study, non-coated rawhide numerically (but not significantly) reduced calculus formation by 29.2% while HMP-coated rawhide significantly reduced calculus formation by 42.3%.

While the invention has been illustrated and described in detail in the foregoing description, the same is to be considered as illustrative and not restrictive in character, it being understood that only the preferred embodiments have been described and that all changes and modifications that come within the spirit of the invention are desired to be protected.

What is claimed is:

1. An article useful against the build-up of dental calculus on the teeth of animals comprising a chew product containing an amount of sodium hexametaphosphate effective to reduce the development of dental calculus.

2. The article of claim 1 which is prepared by contacting the chew product with an aqueous solution of sodium hexametaphosphate.

3. The article of claim 2 in which the contacting is with a solution containing at least about 0.5% by weight sodium hexametaphosphate.

4. The article of claim 3 in which the contacting is with a solution containing from about 0.5% to about 3.0% by weight sodium hexametaphosphate.

5. The article of claim 1 comprising a rawhide chew product.

6. A method for producing an improved chew product useful against the build-up of dental calculus on the teeth of animals comprising treating the chew product to contain an amount of sodium hexametaphosphate effective to reduce the development of dental calculus.

7. The method of claim 6 in which said treating comprises soaking the chew product in an aqueous solution of sodium hexametaphosphate.

8. The method of claim 7 in which said soaking is in a solution containing at least about 0.5% by weight sodium hexametaphosphate.

9. The method of claim 8 in which said soaking is in a solution containing about 0.5% to 3.0% by weight sodium hexametaphosphate.

10. The method of claim 6 in which the chew product is a rawhide chew product.

11. A method for reducing and/or preventing the build-up, deposit and/or formation of dental calculus on the teeth of animals which comprises contacting the teeth with a chew product containing an amount of sodium hexametaphosphate effective to reduce the development of dental calculus.

12. The method of claim 11 in which said contacting is with a chew product prepared by treating the chew product with an aqueous solution of sodium hexametaphosphate.

13. The method of claim 12 in which said contacting is with a chew product treated with a solution containing at least about 0.5% by weight sodium hexametaphosphate.

14. The method of claim 13 in which said contacting is with a chew product treated with a solution containing from about 0.5% to about 3.0% by weight sodium hexametaphosphate.

15. The method of claim 11 in which said contacting of the teeth with the chew product is for a period of at least 10 minutes.

16. The method of claim 15 in which said contacting of the teeth with the chew product is for a period of at least 1 hour.

17. The method of claim 11 in which the chew product is a rawhide chew product.

\* \* \* \* \*